(12) United States Patent
Krolnik et al.

(10) Patent No.: US 7,766,419 B2
(45) Date of Patent: Aug. 3, 2010

(54) SLIDING PANEL ARRANGEMENT FOR A VEHICLE

(75) Inventors: Andrew James Krolnik, Brooklyn Park, MN (US); John Marsolek, Watertown, MN (US)

(73) Assignee: Caterpillar Paving Products inc., Minneapolis, MN (US)

( * ) Notice: Subject to any disclaimer, the term of this patent is extended or adjusted under 35 U.S.C. 154(b) by 315 days.

(21) Appl. No.: 11/949,144

(22) Filed: Dec. 3, 2007

(65) Prior Publication Data
US 2009/0140548 A1    Jun. 4, 2009

(51) Int. Cl.
*B60N 99/00* (2006.01)
(52) U.S. Cl. ............... 296/193.11; 180/69.2; 180/89.17
(58) Field of Classification Search ............ 296/193.11; 180/69.2, 69.24, 69.21, 69.22, 69.23, 89.17, 180/756
See application file for complete search history.

(56) References Cited

U.S. PATENT DOCUMENTS

| 2,103,372 A | 12/1937 | Lange |
| 2,837,372 A | 6/1958 | Odom |
| 3,487,887 A | 1/1970 | Pensa |
| 4,270,623 A | 6/1981 | Brandl et al. |
| 6,311,796 B1 | 11/2001 | Mayer |
| 6,953,220 B2 * | 10/2005 | Takehara ............... 296/193.11 |

FOREIGN PATENT DOCUMENTS

| CA | 2292151 A1 | 11/2000 |
| DE | 10157709 A1 | 6/2003 |
| EP | 1097856 A | 5/2001 |
| JP | 05-246351 A1 | 9/1993 |
| JP | 11-228088 A1 | 8/1999 |

* cited by examiner

*Primary Examiner*—Lori L Lyjak
(74) *Attorney, Agent, or Firm*—Leydig, Voit & Meyer

(57) ABSTRACT

A sliding panel arrangement for a vehicle wherein a panel is adapted to be coupled to a vehicle body, at least two linear bearings or at least one longitudinal member being disposed on the panel, the other of the at least two linear bearings or at least one longitudinal member being adapted to be coupled to the vehicle body. The longitudinal member is sized and disposed to slide within the linear bearings, the panel sliding between closed and open positions over a vehicle compartment.

20 Claims, 2 Drawing Sheets

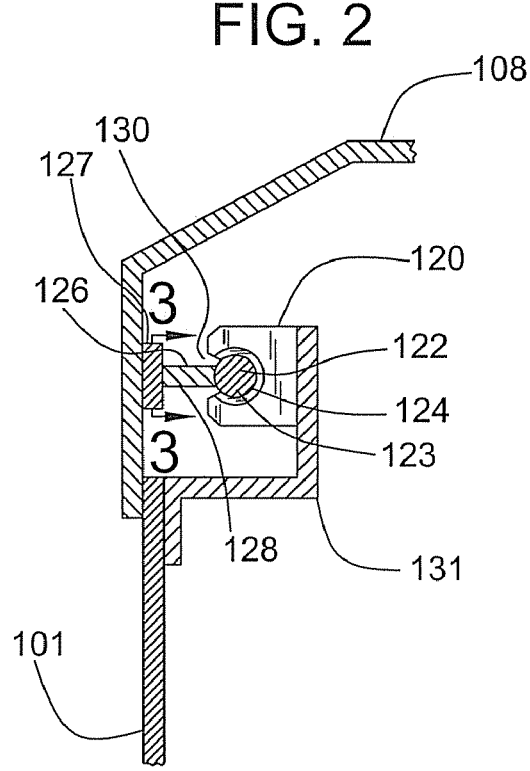
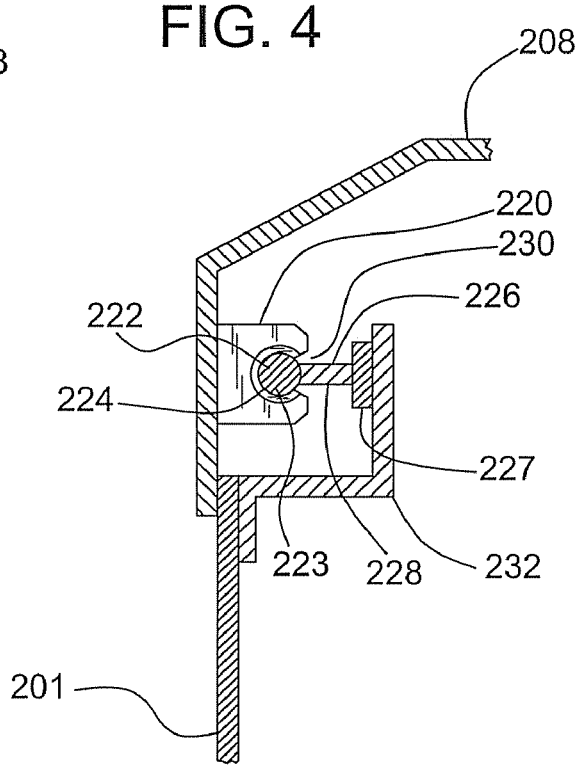
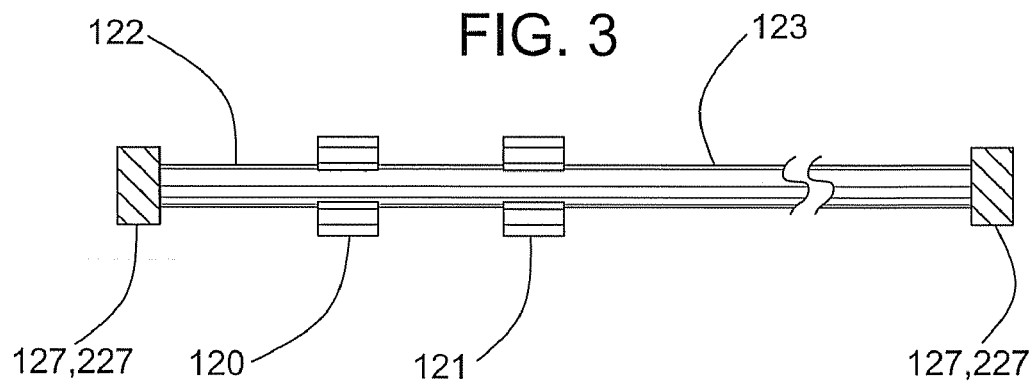

SLIDING PANEL ARRANGEMENT FOR A VEHICLE

TECHNICAL FIELD

This patent disclosure relates generally to movable panels for motor vehicles and, more particularly to a sliding hood arrangement for such vehicles.

BACKGROUND

New environmental standards and increasing fuel costs have required that vehicles function more efficiently. Enhancements to the individual systems of the vehicle, as well as the integration of these systems may offer increases in the overall efficiency of vehicle operation. A vehicle cooling package, for example, operates less efficiently when warmer air flow is provided to the system as opposed to cooler air being provided. Warm or hot air flow often results when hot air from an engine is allowed to escape from the engine compartment of the vehicle and enter the engine cooling package. Inasmuch as the air from the engine compartment is generally warmer than ambient air, unless the warm air from the engine is channeled away or separated from the air intake for the cooling package, the cooling package will operate less efficiently than would be the case with a cooler flow of air.

The constriction and relative locations of the components of the vehicle may enhance opportunities for warm engine air to flow into the engine cooling package. For example, many vehicles require movable panels, such as hoods covering engine compartments, so that inside internal components of the vehicles may be accessed quickly and easily. Vehicle panels that are easy to move or remove, however, often provide paths for air to enter or exit the area where the vehicle panel attaches to the vehicle body. Warm air, for example, may exit all engine compartment near where a hood connects to a vehicle body. Inasmuch as the air intake to the engine cooling package is typically disposed to draw outside air into the cooling package, if warm air escaping from the engine compartment is drawn into the vehicle's cooling package, the cooling package will function less efficiently than if cooler air is provided. Thus, it is desirable to minimize or eliminate air paths from the warm engine compartment in the vicinity of the air intake to the vehicle cooling package.

Vehicle panels are often rigidly connected to the vehicle by nuts and bolts, hinges, and linkage systems. These panel systems are often difficult to open, and often occupy valuable space within the vehicle compartment.

U.S. Pat. No. 4,270,623 to Michael C. Brandl et al. (the '623 patent) discloses a sliding hood for a tractor. The '623 patent discloses modifications to a machine hood such that the hood is easier to remove, allowing the tractor hood to open and close by sliding. The arrangement of the '623 patent disclosure provides only limited improvements to the functionality of a vehicle hood, however, and further enhancements are desirable.

Any modifications to either the internal systems or the exterior of a vehicle, however, ideally should not interfere with general operation of the machine. For example, operators of vehicles must have adequate sightline to allow them to safely and efficiently operate the same. More particularly, operators must be able to view as much of the terrain around them as possible, not only to permit them to efficiently operate the vehicle, but also to ensure safe operation. In this regard, blind spots and obstructions to the operator's vision should be reduced as much as possible.

It is therefore desirable to provide vehicles that may be operated safely and efficiently. The present disclosure is directed to overcoming one or more of the shortcomings of the art set forth above.

SUMMARY

The disclosure describes, in one aspect, a vehicle comprising a vehicle body with an opening and a complementary panel. The vehicle includes at least two linear bearings disposed along either the panel or the body substantially adjacent to the opening, and a longitudinal member which is sized and disposed to slide within the linear bearings and is connected to the other of the panel or body. The panel slides relative to the opening between a closed position in which the panel substantially covers the opening, and an open position in which the opening is at least partially uncovered.

The disclosure describes in another aspect, a vehicle panel arrangement adapted for sliding communication with a vehicle body having an opening. The vehicle panel is adapted for sliding communication between a closed position at least partially covering the opening, and an open position at least partially uncovering the opening. The panel arrangement includes a panel, at least two linear bearings, and at least one longitudinal member sized and disposed to slide within the linear bearings. The panel has an edge, and one of either the longitudinal member or the bearings is disposed along the edge of the vehicle panel, and the other of the longitudinal member or the bearings is adapted to be coupled to the vehicle body substantially adjacent the opening.

The disclosure describes in another aspect, a method of selectively covering an opening in a body of a vehicle. The method includes providing the vehicle, having at least one motivator, and the body including the opening, and providing a panel complementary to the opening. The method further includes disposing at least two linear bearings along at least one of a side of the panel or the body substantially adjacent opposite sides of the opening, disposing at least one longitudinal member along the other of the side of the panel or the body substantially adjacent opposite sides of the opening, and slidably disposing the longitudinal member within the linear bearings dispose the panel in sliding communication between a closed position at least partially covering the opening, and an open position at least partially uncovering the opening as the longitudinal member slides within the linear bearings.

BRIEF DESCRIPTION OF THE DRAWING(S)

FIG. 2 is an axial fragmentary, cross-sectional view of a sliding panel arrangement for a vehicle taken along line 2-2 in FIG. 1.

FIG. 3 is a fragmentary view of the longitudinal member and two linear bearings taken along line 3-3 in FIG. 2.

FIG. 4 is an axial fragmentary, cross-sectional view of an alternate embodiment of a sliding panel arrangement, similar to the view of FIG. 2.

DETAILED DESCRIPTION

Figure 1:
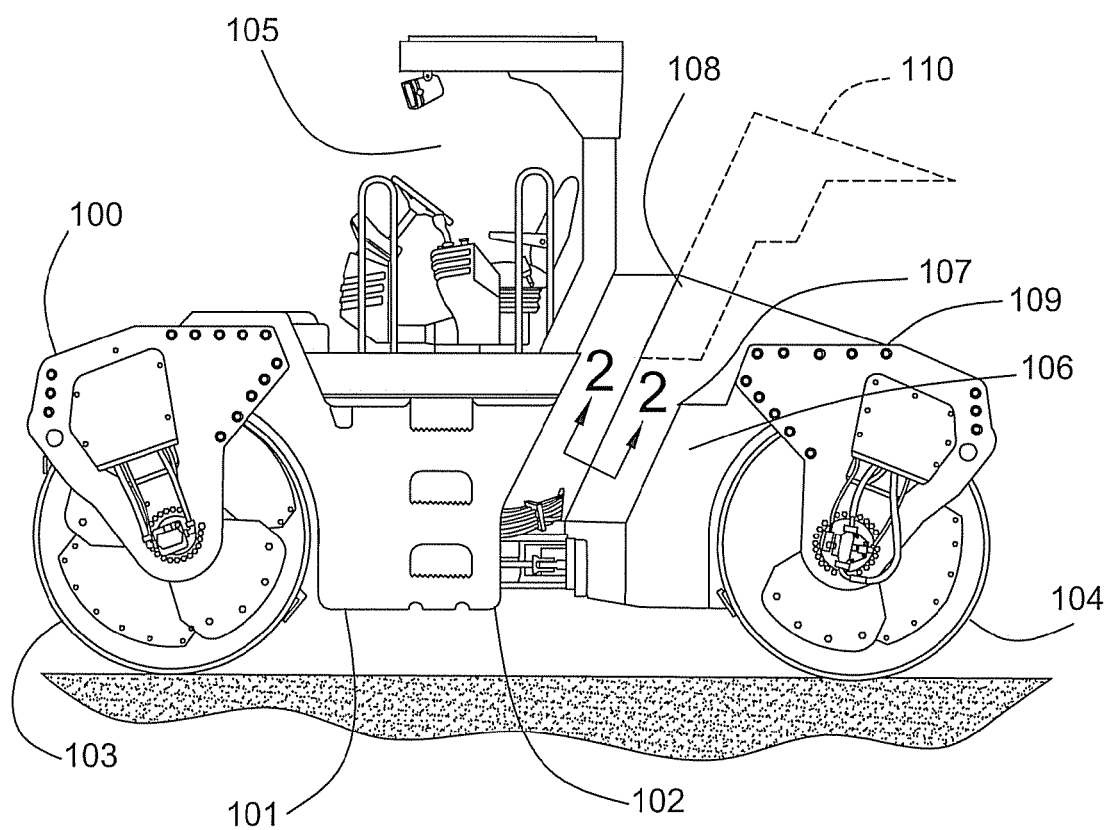
FIG. 1 is a side elevational view of an exemplary vehicle embodying the disclosure.

This disclosure relates to an arrangement for coupling a panel to a vehicle body. The coupling mechanism allows a vehicle panel to be movable while minimizing the monopolization of space within the compartment. Further, when utilized in connection with an engine compartment, the moveable panel arrangement may inhibit the escape of warm air from the engine compartment.

Referring to the drawings, there is shown a vehicle 100 with a vehicle body 101 supported on a frame 102, the frame being supported on a plurality of motivators, in this case, a pair of rollers 103, 104. The vehicle body 101 includes a cab 105 for supporting an operator. The vehicle body 101 additionally forms a compartment, here, an engine compartment 106, and an opening 107 that allows access to the engine compartment 106.

To cover the opening, the vehicle body 101 includes a panel 108 in sliding communication with the remainder of the vehicle body 101. The panel 108 is selectively movable and may be disposed in a closed position 109, wherein the panel substantially covers the opening 107 and the engine compartment 106 (as shown, for example, in solid lines in FIG. 1), and an open position 110, wherein the panel substantially does not cover the opening 107 or the engine compartment 106 (as shown, for example, in phantom in FIG. 1). While the illustrated compartment is an engine compartment 106, the compartment may be any type and in any location within the vehicle body 101.

Moreover, although a compactor is illustrated in FIG. 1, the embodiments described herein are provided by way of example and for illustration purposes only. Therefore, the examples set forth herein should not be construed as limiting based on the specific vehicle described in association therewith, but should be construed as applicable to any other type of machine or vehicle that includes a panel 108 covering an opening 107. Thus, the term "vehicle" may refer to any machine or vehicle that includes such structure, including any machine that performs some type of operation associated with an industry known in the art. For example, a vehicle may be an earth-moving machine, such as a wheel loader, excavator, dump truck, backhoe, motorgrader, material handler, soil compactor, asphalt compactor, paving machine or the like. Further, a vehicle may include motivators such as wheels, rollers, track systems or the like. The vehicle may also include an attached implement, which may be utilized and employed for a variety of tasks, including, for example, loading, compacting, lifting, brushing, breaking, and include for example, buckets, compactors, forked lifting devices, brushes, grapples, cutters, shears, blades, breakers/hammers, augers, and others.

Returning to the drawings, for the sake of clarity, similar structures in FIGS. 2 and 4 will be similarly numbered, although those of FIG. 2 will include a prefix of 1XX, while those of FIG. 4 will include a prefix of 2XX. The panel 108, 208 is slidably connected to the vehicle body 101, 201 using at least two linear bearings 120, 121, 220 that include a channel 124, 224 adapted to receive at least one longitudinal member 122, 222. In use, the longitudinal member 122, 222 slides within the channels 124, 224 of the linear bearings 120, 121, 220 to allow the panel 108, 208 to slide outward from the vehicle body 101, 201.

FIGS. 2 and 4 depict two of various possible embodiments of the stricture. In the embodiment of FIG. 2, the longitudinal member 122 is coupled to the movable panel 108, while the linear bearings 120, 121 are coupled to the vehicle body 101 (see also FIG. 3). Conversely, in the embodiment of FIG. 4, the longitudinal member 222 is coupled to the vehicle body 201, while the linear bearings 220 are coupled to the movable panel 208. In both cases, at least one set of linear bearings 120, 121, 220 and a mating longitudinal member 122, 222 are disposed along either side of the opening 107 such that the sliding of the longitudinal members 122, 222 within the linear bearings 120, 121, 220 allows the panel 108, 208 to slide between substantially closed and open positions 109, 110 relative to the opening 107 in the vehicle body 101, 201. The term "side" as used herein refers to the peripheral sides of the opening 107. Similarly, when referring to opposite "sides" of the panel 108, 208, the term refers to the generally peripheral sides, rather than, for instance, the outside and the inside.

The longitudinal member 122, 222 includes an elongated bar 123, 223 which may have any appropriate cross-section, so long as the channels 124, 224 of the bearings 120, 121, 220 include complementary structures that permit a smooth sliding of the bar 123, 223 within the linear bearings 120, 121, 220. In the illustrated embodiments, the bar 123, 223 has a substantially circular structure. The bar 123, 223 may have an alternate cross-section, however, such as, for example, an oval, triangular, rectangular, pentagonal, etc., shape, so long as the channels 124, 224 of the bearings 120, 121, 220 are correspondingly shaped.

To connect the elongated bar 123, 223 to either the panel 108 (as in FIG. 2) or the vehicle body 201 (as in FIG. 4), at least one support 126, 226 is provided. The longitudinal member 122, 222 may include any appropriate support 126, 226 structure, so long as the support 126, 226 structure does not interfere with the smooth sliding of the bar 123, 223 within the channels 124, 224 of the linear bearings 120, 121, 220. The support 126, 226 may include two individual support elements, include more than two individual support elements, or a single, elongated support element.

The support 126, 226 in the illustrated embodiments includes a base portion 127, 227 and an upright portion 128, 228, although alternate designs are possible. In FIGS. 2 and 4, the support 126, 226 is coupled to the elongated bar 123, 223 by any appropriate mechanism such as, by way of example only, welding, adhesive, interference fit, etc. Alternately, the elongated bar 123, 223 and the support(s) 126, 226 may be unitarily formed by casting, welding, molding, extruding, or the like. In still other embodiments, the longitudinal member 122, 222 or the support(s) 126, 226 may be unitarily formed with the vehicle panel 108 or vehicle body 201.

The support 126, 226 may include all alternate design. For example, where supports are provided at either end of the elongated bar 123, 223 as shown in FIG. 3, the supports may merely be blocks having a recess or bore therethrough for receiving the ends of the elongated bar 123, 223. In such an arrangement, the channel 124, 224 of the linear bearings 120, 121, 220 may completely encircle the circumference of the elongated bar 123, 223 as the longitudinal member 122, 222 and bearings 120, 121, 220 slide relative to one another.

The support 126, 226 may be coupled to the vehicle body 201 or panel 108 by any appropriate means, such as, for example, nuts and bolts, welding, rivets, adhesive, or alternate arrangement. Moreover, the support 126, 226 may be coupled directly to the vehicle body or panel 108, as shown in FIG. 2, or it may be coupled to a bracket 232, which is further secured to the vehicle body 201 or panel by any appropriate means, as shown in FIG. 4.

The longitudinal member 122, 222 or its individual components may be fabricated from one or more of any appropriate materials. By way of example only, the longitudinal member 122, 222 or its individual components may be formed of steel, or polymeric material, reinforced or otherwise, etc.

Turning now to the linear beatings 120, 121, 220, the respective channels 124, 224 substantially enclose a sufficient portion of the circumference of the elongated bar 123, 223 to retain the longitudinal member 122, 222 in sliding communication with the linear bearings 120, 121, 220 regardless of the orientation of the vehicle body 101, 201 and panel 108, 208. To allow for the support 126, 226 connection(s) to the elongated bar 123, 223 to the panel 108 or vehicle body 201 along the length of the bar 123, 223, the linear bearings 120, 121, 220 may include an opening 130, 230 from an external surface to the channels 124, 224 of the linear bearings 120, 121, 220, as shown in FIGS. 2 and 4. Alternately, where the elongated bar 123, 223 is connected to the vehicle 100 only at its distal ends, as may be the case, for example, in FIG. 3, the linear bearings 120, 121, 220 need not include such an opening 130, 230.

As with the longitudinal member 122, 222, the linear bearings may be mounted directly to the vehicle body or the panel 208, as depicted in FIG. 4, or to a bracket 131, which is further mounted to the vehicle body 101 or panel, as shown in FIG. 2. The linear bearings 120, 121, 220 may be mounted to the vehicle body 101, panel 208, or the bracket 131, and the bracket 131 mounted to the vehicle body 101 or panel 208 by any appropriate method, such as, by way of example only, nuts and bolts, welding, adhesive, etc.

It will be appreciated, that a practical application of the arrangement may provide either of these arrangements of FIGS. 2 and 4, a combination of the two, or another arrangement in keeping with this disclosure. For example, the arrangement of FIG. 2 may be provided on opposite sides of the panel 108. That is, sets of at least two linear bearings 120, 121 may be disposed along respective, opposite sides of the vehicle body 101, while longitudinal members 122 may be coupled to the panel 108 along corresponding sides of the opening 107. In an alternate arrangement, the linear bearings 220 may be disposed on the panel 208 along the opposite sides of the opening 107, while longitudinal members 222 are disposed along the vehicle body 201 along opposite sides of opening 107. In yet another embodiment, the arrangement of FIG. 2 may be utilized along one side of the opening 107, while the arrangement of FIG. 4 is utilized along the other side of the opening 107. In another embodiment four sets of linear bearings and at least two a longitudinal members may be provided, a pair of sets being disposed along opposite sides of the opening 107.

INDUSTRIAL APPLICABILITY

Some embodiments of the disclosed sliding panel arrangement may be useful in a variety of machines, and in motor vehicles, in particular, to provide more efficient operation by enhancing the fit of a movable panel to the vehicle body. In this way, the arrangement may reduce the flow of warm air out of all engine compartment by reducing pathways for air to enter or exit the engine compartment when the machine hood is in the closed position.

Further, some embodiments of the sliding panel arrangement may provide space efficient packaging of the components used to move a vehicle panel. Some embodiments may allow for the overall size of the engine compartment to be reduced because the sliding panel arrangement may minimize the use of valuable engine compartment space. Thus, the arrangement may be particularly useful in vehicles where it is desirable to reduce or minimize the overall size of the engine compartment.

In some embodiments, this reduced engine compartment size may allow for reduced size of the vehicle body, and may minimize blind spots and viewing obstructions for the operator, enhancing the operator's view of the areas surrounding the machine, which may also increase the operator's ability to operate the vehicle safely. As a result of the decreased engine compartment size, some embodiments of the sliding panel arrangement may also be particularly useful in machines where an operator's view of the machine itself and the areas surrounding the machine are particularly important, such as asphalt or soil compaction vehicles.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A vehicle comprising
a body including an opening and a complementary panel,
at least two linear bearings disposed along at least one of the panel or the body substantially adjacent the opening,
at least one longitudinal member disposed along the other of the at least one panel or the body substantially adjacent the opening, and
the longitudinal member being sized and disposed to slide within the linear bearings, the panel being in sliding communication between a closed position at least partially covering the opening, and an open position at least partially uncovering the opening as the longitudinal member slides within the linear bearings.

2. The vehicle of claim 1 wherein the body further includes an engine compartment, and wherein said opening opens into the engine compartment.

3. The vehicle of claim 1 further including at least one bracket, attached to at least one of the body or the panel, at least one of the longitudinal member or the at least two linear bearings being coupled to the at least one bracket.

4. The vehicle of claim 1 wherein the longitudinal member is unitarily formed with the panel or body along which it is disposed.

5. The vehicle of claim 1 wherein the at least two linear bearings include an internal channel, at least a portion of the longitudinal member is slidably disposed within the channels of the linear bearings.

6. The vehicle of claim 5 wherein the channels have a shape enclosing at least 270° of the circumference of at least a portion of the longitudinal member.

7. The vehicle of claim 6 wherein the channels have a shape enclosing 360° of the circumference of at least a portion of the longitudinal member.

8. The vehicle of claim 5 wherein the longitudinal member comprises an elongated bar and at least one support disposing the elongated bar along the panel or body, the elongated bar being slidably disposed within the channels of the linear bearings.

9. The vehicle of claim 8 wherein the longitudinal member comprises a plurality of said supports.

10. The vehicle of claim 8 wherein the elongated bar includes one of the following cross-sectional geometries: round, oval, rectangular, pentagonal, hexagonal, heptagonal, octagonal, or multisided.

11. The vehicle of claim 1 including at least two linear bearings and at least one longitudinal member being disposed along a first side of the opening, and at least two linear bearings and at least one longitudinal member being disposed along a second, opposite side of the opening.

12. The vehicle of claim 11 including at least four linear bearings and at least two longitudinal members being disposed along said first side of the opening.

13. The vehicle of claim 12 including at least four linear bearings and at least two longitudinal members being disposed along said second side of the opening.

14. The vehicle of claim 13 wherein the vehicle is a compactor, the longitudinal member comprises an elongated bar and at least one support disposing the elongated bar along the panel or body, the elongated bar having a substantially round cross-section, and being disposed within the channels of the linear bearings.

15. A sliding panel arrangement adapted for sliding communication with a vehicle body having an opening, the vehicle panel being adapted for sliding communication between a closed position at least partially covering the opening, and an open position at least partially uncovering the opening, the vehicle panel arrangement comprising
    a panel having an edge,
    at least two linear bearings,
    at least one longitudinal member sized to slide within the linear bearings,
    one of either the longitudinal member or the bearings being disposed along the edge of the at least one panel, and
    the other of the longitudinal member or the bearings being adapted to be coupled to the vehicle body substantially adjacent the opening.

16. The vehicle panel of claim 15, wherein the at least two linear bearings are disposed along the edge of the panel, and the longitudinal member is adapted to be coupled to the corresponding side of the vehicle body substantially adjacent to the opening.

17. The vehicle panel of claim 15, wherein the longitudinal member is disposed along the edge of the panel, and the at least two linear bearings are adapted to be coupled to the corresponding side of the vehicle body substantially adjacent to the opening.

18. A method of selectively covering an opening in a body of a vehicle comprising
    providing the vehicle, said vehicle including at least one motivator and the vehicle body including the opening,
    providing a panel complementary to said opening,
    disposing at least two linear bearings along at least one of a side of the panel or the body substantially adjacent opposite sides of the opening,
    disposing at least one longitudinal member along the other of the side of the panel or the body substantially adjacent opposite sides of the opening,
    slidably disposing the longitudinal member within the linear bearings to place the panel in sliding communication between a closed position at least partially covering the opening, and an open position at least partially uncovering the opening as the longitudinal member slides within the linear bearings.

19. The method of claim 18 wherein the step of disposing at least two linear bearings includes disposing at least two sets of at least two linear bearings along at least one of two opposite sides of the panel or the body substantially adjacent opposite sides of the opening, the step of disposing the at least one longitudinal member includes disposing at least two longitudinal members disposed along the other of the two opposite sides of the panel or the body substantially adjacent opposite sides of the opening, and the step of slidably disposing includes slidably disposing a first of the longitudinal members in a first of the two sets of linear bearings, and slidably disposing a second of the longitudinal members in a second of the two sets of linear bearings.

20. The method of claim 18 wherein the step of disposing at least two linear bearings includes disposing a first of the two sets of said bearings along said body substantially adjacent the side of the opening, the step of disposing the at least one longitudinal member includes disposing a first of the longitudinal members along the side of the panel.

* * * * *